(No Model.)
A. N. PARRY.
CARRIAGE.
No. 467,518.  Patented Jan. 26, 1892.
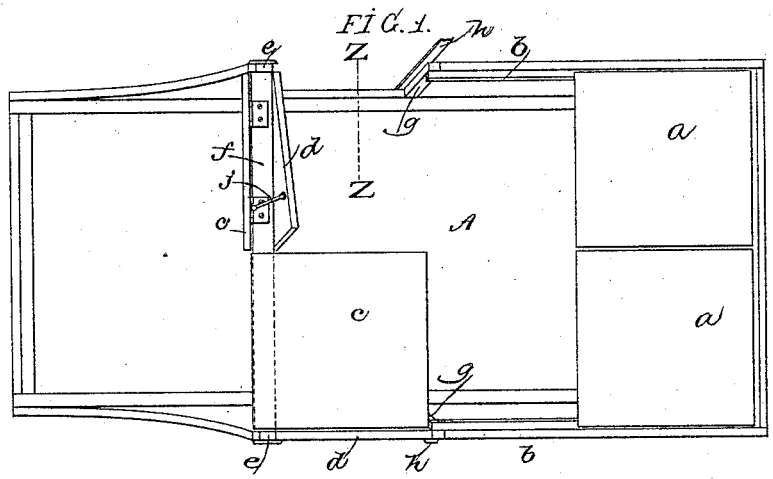
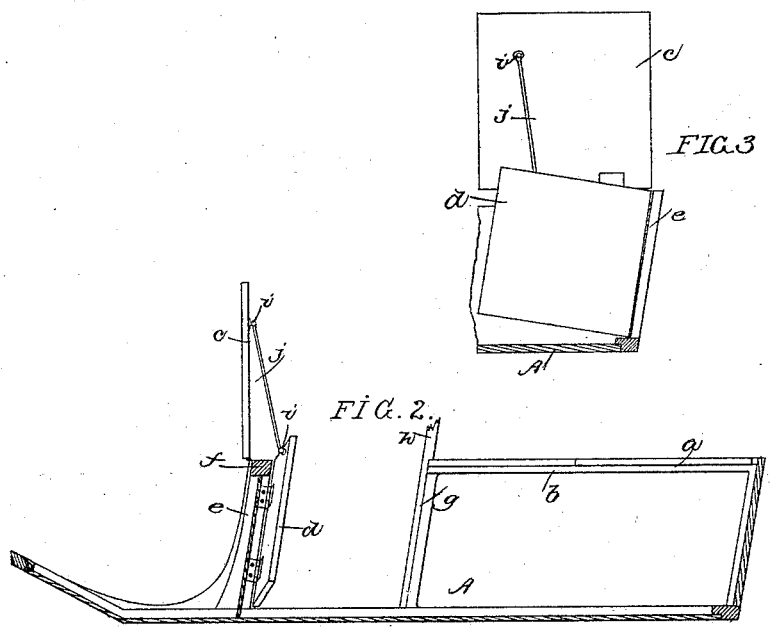
Witnesses:
A. C. Orne
Clara L. Prower
Inventor:
Augustus N. Parry
per J. W. Porter
Attorney.

UNITED STATES PATENT OFFICE.

AUGUSTUS N. PARRY, OF AMESBURY, MASSACHUSETTS.

CARRIAGE.

SPECIFICATION forming part of Letters Patent No. 467,518, dated January 26, 1892.

Application filed July 25, 1891. Serial No. 400,682. (No model.)

*To all whom it may concern:*

Be it known that I, AUGUSTUS N. PARRY, of Amesbury, in the county of Essex and State of Massachusetts, have invented a new and useful Improvement in Carriages, which will, in connection with the accompanying drawings, be hereinafter fully described, and specifically defined in the appended claims.

In said drawings, Figure 1 is a top plan view of a vehicle-body with attached seats, showing my invention thereto applied. Fig. 2 is a sectional elevation, the section being longitudinal and vertical and showing the interior of the right-hand ("off") side of the body as viewed from the left-hand ("near") side of the body. Fig. 3 is a detached sectional perspective view taken as viewed from the rear of the vehicle, with the sill and floor of the body shown in section on line Z and with the right-hand door and half of the front seat as in their respective positions when the seat is raised and the door thereby opened.

This invention has for its object the opening of the door in the side of the body (to give access to or egress from the rear seat) by the act of raising the front seat, and the closing of said door by the closing down of the front seat; and it consists in certain features of novelty and the combination thereof, as will be next herein described, and then specified in the appended claims.

Referring again to said drawings, A represents the body, which may be of such style and pattern as desired. The halves of the rear seat are shown at *a a;* but if preferred, said seat may, instead, be entire, and it is shown as supported by ledges *b b.* The halves of the front seat (shown at *c c*) are shown as hinged at their front edges to riser-bar *f*, by which they are, when turned down, in part supported, and in part by ledges *b*, extended upon doors *d*. Said doors are hinged at their front to pillars *e* instead of rear edge, as heretofore, and are arranged to swing inward instead of outward, as has been the practice, and they are respectively connected with the parts *c* of the seat by rod *j*, the ends of which are connected with the door and seat by ball-and-socket joints, so as to allow a universal motion of the rod relatively to the door and seat, and hence the turning up of either half of the seat will open the door on that side, while the reverse action of the door occurs when the seat is turned down. It will thus be seen that by hinging the doors at their front edge to the front pillar *e* instead of hanging them to rear pillar *g* at their rear edge, and by arranging them to swing inward instead of outward, as has been heretofore practiced, they may be connected with the respective halves of the front seat, so that the raising of either half of the seat (for purpose of ingress to or egress from the rear seat) will open the door on the side of the part of the seat raised, thereby effecting a free passage from the rear seat to the earth, or the reverse. As the doors close against lip *h* of pillar *g* and are held closely thereto by rod *j*, all risk of rattling of the doors is thereby obviated; but for greater precaution said rod may be formed in two parts, one part tubular and with the other telescoped therein with a limited telescopic action and an expanding spring so arranged in the tubular part as to tend constantly to extend or lengthen the rod and thereby hold the door pressed against lip *h* and thus render rattling of the door impossible.

I claim as my invention—

1. A carriage-body door hinged to a vertical standard at its front edge and arranged to swing inwardly and connected with a rising seat, so that as the seat is raised the door is thereby swung inward, substantially as specified.

2. In a vehicle, the combination of door *d*, arranged to swing inwardly, seat *c*, hinged at its front edge, and a rod connecting the two by joints having a pivoted action, substantially as specified.

AUGUSTUS N. PARRY.

Witnesses:
GEORGE H. BRIGGS,
DELL W. DOLBIER.